United States Patent
Mowry

(10) Patent No.: US 12,249,834 B2
(45) Date of Patent: Mar. 11, 2025

(54) SPLIT LOAD CONNECTION

(71) Applicant: Renew Power Systems Inc., Minneapolis, MN (US)

(72) Inventor: Gregory S. Mowry, Burnsville, MN (US)

(73) Assignee: Renew Power Systems Inc., Minneapolis, MN (US)

( * ) Notice: Subject to any disclaimer, the term of this patent is extended or adjusted under 35 U.S.C. 154(b) by 0 days.

(21) Appl. No.: 17/235,860

(22) Filed: Apr. 20, 2021

(65) Prior Publication Data

US 2021/0328428 A1     Oct. 21, 2021

Related U.S. Application Data

(60) Provisional application No. 63/012,377, filed on Apr. 20, 2020.

(51) Int. Cl.
| | |
|---|---|
| *H02J 3/00* | (2006.01) |
| *H02J 3/28* | (2006.01) |
| *H02J 3/38* | (2006.01) |
| *H02J 9/04* | (2006.01) |

(52) U.S. Cl.
CPC ............. *H02J 3/007* (2020.01); *H02J 3/28* (2013.01); *H02J 3/381* (2013.01); *H02J 9/04* (2013.01); *H02J 2310/12* (2020.01); *Y02B 10/00* (2013.01)

(58) Field of Classification Search
CPC ....................................................... H02J 3/007
See application file for complete search history.

(56) References Cited

U.S. PATENT DOCUMENTS

| | | | | |
|---|---|---|---|---|
| 7,119,457 | B1 * | 10/2006 | Flegel ...................... | H02J 3/14 307/64 |
| 10,211,669 | B1 * | 2/2019 | Wildstone ............... | H02J 9/061 |
| 10,840,735 | B1 * | 11/2020 | Cooper ............ | H02J 13/00004 |
| 2010/0038966 | A1 * | 2/2010 | Espeut, Jr. ................ | H02J 3/14 335/73 |
| 2019/0067986 | A1 * | 2/2019 | Haj-Maharsi ....... | H01M 10/446 |
| 2021/0234398 | A1 * | 7/2021 | Morton ..................... | H02J 3/40 |

* cited by examiner

*Primary Examiner* — Daniel Cavallari
(74) *Attorney, Agent, or Firm* — Foley & Lardner LLP

(57) ABSTRACT

If an additional power source is introduced at the distribution level it is then possible for power to flow back into the grid. This is a potentially undesired scenario, so much so that some entities enacted laws to regulate/control this scenario. There are also regulations in some places that restricts off-grid scenarios. The present disclosure is directed to embodiments that can operate with the grid, or islanded, with a range of grid load from 0-100%. 10% grid load is described as a model for abiding by legal interconnection/tax requirements. At the interconnection point/points there is typically protection and or control technology such as fuses in a circuit-breaker that limit current to a particular load or loads. A solution to this scenario, using split load configuration according to embodiments of the present disclosure, allows for both distributed generation and no power flow back into the grid.

12 Claims, 5 Drawing Sheets

Arbitrary Possible Configurations

Standard Load Configuration

SPLIT LOAD CONNECTION

RELATED APPLICATIONS

The present application claims the benefit of priority under 35 U.S.C. Section 119(e) of U.S. Provisional Patent Application No. 63/012,377 entitled SPLIT LOAD CONNECTION, filed Apr. 20, 2020, which is hereby incorporated by reference herein in its entirety.

TECHNICAL FIELD

The present disclosure is directed to power distribution systems and methods, and more particularly to systems and methods for commissioning or otherwise connecting a microgrid to a load in conjunction with a utility grid.

BACKGROUND

Traditional grid-level power systems generate, transmit, and distribute power. At the distribution level, the source power reaches the load where it is used (converted). At the interconnection point(s), there is typically protection and/or control technology such as fuses and/or circuit-breakers that limit current to a particular load or loads.

If an additional generation source is introduced at the distribution level, such as introduction of a distributed energy resource (DER), under the right conditions it is possible for power to flow from the DER back into the grid-level power system. This is a potentially undesired scenario if not properly controlled, so much so that some entities have enacted laws to regulate or otherwise control this scenario. As an example of an undesirable scenario, under grid-fault conditions power flow can potentially flow from a DER back into a grid, which potentially may accidently injure or electrocute someone working to restore power on the faulted grid.

There are also regulations in some places that restrict off-grid scenarios or at least charge a rate payer for a connection fee even if they do not use any electrical power. Given these grid-related conditions, which serve as obstacles for the general deployment of sustainable and renewable DERs, an innovation that eliminates these problems and permits the full safe use of sustainable and renewable DERs may be desirable.

SUMMARY

The present disclosure provides power distribution systems and methods for commissioning or otherwise connecting a supplemental energy source such as a DER or microgrid, to a load in conjunction with a traditional grid-level power system (e.g. a utility grid). The systems and methods of the present disclosure enable sustainable and renewable DERs to operate in concert with the traditional grid-level power system without affecting the traditional grid-level power system.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
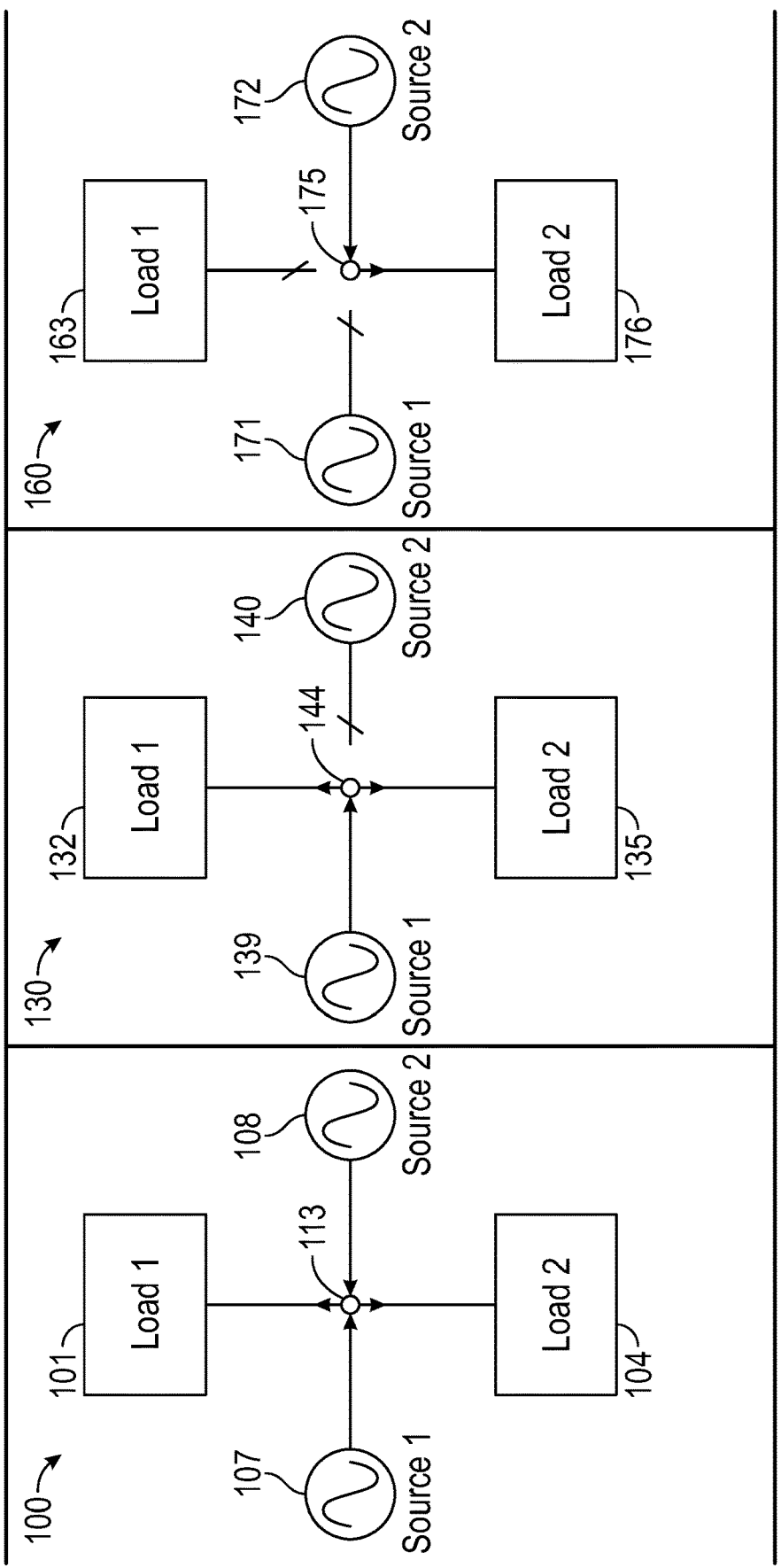
FIG. 1 illustrates configurations for a split load connection, according to some embodiments of the present disclosure.

The present disclosure provides power distribution systems and methods for commissioning or otherwise connecting a supplemental energy source such as a DER or microgrid, to operate in concert with a traditional grid-level power system (hereinafter a "utility grid") to provide electricity to a load. Power distribution systems and methods, according to some embodiments of the present disclosure, operate in conjunction with the utility grid and without affecting the utility grid. Included in these embodiments are systems and methods for connecting a load to a grid that allows a microgrid or other electricity source to supply electricity to a load in conjunction with the utility grid and without affecting the utility grid.

Traditional utility grids generate, transmit, and distribute power. At the distribution level, the source power reaches the load where it is used (converted). At the interconnection point(s), there is typically protection and/or control technology such as fuses and/or circuit-breakers that limit current to a particular load or loads.

When additional generation source is introduced at the distribution level of a utility grid, such as introduction of a distributed energy resource (DER), a risk of back flow can be created. Under certain conditions it is possible for power to flow from the DER back into the utility grid. This backflow of power back onto the utility grid can be a potentially undesired scenario if not properly controlled, so much so that some entities controlling or regulating utility grids have enacted laws to regulate or otherwise control this scenario. As an example of an undesirable scenario, under grid-fault conditions power flow can potentially flow from a DER back into a grid, which potentially may accidently injure or electrocute someone working to restore power on the faulted grid.

The resulting regulations enacted in some places restrict off-grid scenarios or at least charge a rate payer for a connection fee even if they do not use any electrical power. Given these grid-related conditions, which serve as obstacles for the general deployment of sustainable and renewable DERs, technology such as the embodiments of the present disclosure that can eliminate these problems and permit the full safe use of sustainable and renewable DERs may be desirable.

Systems and methods of the present disclosure facilitate reconfiguring an original load and connecting the reconfigured original load in a manner to be powered at least partially by DERs or a microgrid without affecting a utility grid that is also connected to the original load. The original load, which is comprised of several sub-loads, that is originally powered by the utility grid can reconfigured into two or more separate and distinct load blocks (i.e. the original load is split in two or more portions). By appropriate switch connection, one or more of these separate and distinct load blocks can be powered using sustainable and renewable distributed generation (sometimes referred to as being powered by a microgrid). This arrangement prevents sending power back into the grid since there is no grid connection for this particular load block. The remaining (other) one or more load blocks are solely powered by the grid. If the sustainable and renewable distributed generation cannot supply power to its respective load, then a switch connection is changed to reconnect and restore all of the original load back to being powered by the utility grid. Under no circumstance, via switch configuration and hard-wiring, is the portion of the original load that is off-grid and powered by sustainable and renewable distributed generation capable of back-feeding to the grid.

There are a number of possible switching configurations to achieve this. An example of a configuration is illustrated in the figures and described below with reference to the same and includes with two loads and two sources. The example configuration can be expanded to any number n types of loads and sources. The switching configurations are also simplified in this illustration of the figures and can be expanded to a combination dependent on the number of connections and switches.

In the embodiments to be discussed, an initial existing load that is being powered by the grid is split into two distinct and separate loads with each individually being powered now by two distinct sources. As an example, the utility grid may power 10% of the original load while a sustainable and renewable DER may separately power the remaining 90% of the original load. Three examples of switch configurations are provided: a split configuration, the full load being powered by the grid, and only the 10% grid load being power (the 90% DER powered load is 'off'). The switch/switches can be operated manually or automatically using software or hardware-controlled methods; or a combination of both options.

As previously mentioned, the present disclosure is directed to systems and methods power distribution and/or connecting a load that enable sustainable and renewable DERs to operate in concert with a utility grid without affecting the utility grid. In addition, the disclosed embodiments enable partial or full island mode operation of loads at a distribution site without affecting the utility grid.

Let a percentage magnitude of the existing loads at the distribution location prior to use of this invention be 100%. Some embodiments of the present disclosure enable a range of loads from 0-100% to be powered by sustainable and renewable DERs without affecting the grid. In the following with the use of disclosed embodiments, an illustrative case where 10% of the loads are powered by the grid and the remaining 90% power by sustainable and renewable DERs will be used as a model for abiding by legal interconnection/tax requirements. A solution to this scenario that allows for both distributed generation and no power flow back into the grid shall be proposed.

In one aspect, the invention is a method of commissioning a microgrid. In another embodiment, the invention is a split load configuration that allows for both distributed generation and no power flow back into the grid.

This invention has been developed in response to the present state of the art and, in particular, in response to the problems and needs in the art that have not yet been fully solved by currently available systems and methods. Features and advantages of different embodiments of the invention will become more fully apparent from the following description and appended claims or may be learned by practice of the invention as set forth hereinafter.

Consistent with the foregoing, a method of commissioning a microgrid via a split load switching configuration is disclosed. The objectives of the system are to provide a split load switching configuration that allows for both distributed generation and no power flow back into the grid.

In an embodiment, a method of commissioning a microgrid may include dividing an original load into at least two distinct load blocks; electrically connecting a first load block of the two distinct load blocks to receive electricity from a utility-scale electricity grid; electrically connecting a second load block of the two distinct load blocks to receive electricity from a microgrid; and connecting a switch between the first load block and the second load block, the switch to disconnect the second load block from the microgrid and to connect the second load block to the utility-scale electricity grid (and thereby restore the entire original load to being powered by the utility-scale electricity grid), (if the microgrid is unable to power the second load block), wherein the switch maintains the microgrid isolated from the utility-scale electricity grid.

In other embodiments, the switch may be a manual switch. The switch may further be configured as a break-before-make switch. In an embodiment, the switch may be a double-pole double-throw switch that switches both neutrals and hot circuits of the utility-scale electricity grid and the microgrid.

In an embodiment, the original load may be divided into at least three distinct load blocks. The method further include electrically connecting a third load block of the three distinct load blocks to receive electricity from the microgrid, and connecting a second switch to disconnect the third load block from the microgrid and to connect the third load block to the utility-scale electricity grid, wherein the switch maintains the microgrid isolated from the utility-scale electricity grid.

In other embodiments, the second block may include between 1% and 99% of the original load. In an embodiment, the second block may include between 10% and 90% of the original load. In an embodiment the second block may include between 30% and 70% of the original load. In an embodiment the second block may include 50% of the original load. In an embodiment the second block may include 100% of the original load.

In an embodiment, the switch may restore the entire original load to being powered by the utility-scale electricity grid, if the microgrid is unable to power the second load block.

In certain embodiments, a split-load power distribution system may include two or more power sources. The two or more power sources may include: a utility grid (Grid) connected power source and at least one Distributed Energy Resource (DER) power source. The system may also include at least one electrical load; and at least one power distribution hub (PDH) comprising at least one switch. The PDH may distribute power from a first power source of the two or more power sources to a first partial load of the electrical load. The PDH may distribute power from a second power source of the two or more power sources to a second partial load of the electrical load. The PDH may further control the power flow from the DER, preventing backflow to the Grid.

In other embodiments, the switch may include a circuit protection device. The system may include a frame with multiple electrical receptacles configured to receive multiple power proportional distributions (PPDs). The multiple switches may be detachably plugged-in to the multiple electrical receptacles. The switches may be controlled by the PDH.

In an embodiment, the PDH may also include a control system and a processor. The control system may manage and distribute power from multiple power sources to multiple electrical loads.

In certain embodiments, the DER may also include an energy storage device. The control system may manage and distribute power from multiple power sources by switching one or more of the at least one switches. The control system may monitor the storage capacity of the energy storage device. The control system may send a low energy alert signal to the processor when a first DER's energy storage device's capacity is below a pre-determined level.

In an embodiment, multiple switches of the at least one switch may be electrically connected in parallel.

The concepts of the present disclosure are described and illustrated by referring to certain embodiments. These concepts, however, are not limited in their application to the details of construction and the arrangement of components in the illustrative embodiments and are capable of being practiced or being carried out in various other ways. The terminology in this document is used for description and should not be regarded as limiting. Words such as "including," "comprising," and "having" and variations thereof as used herein are meant to encompass the items listed thereafter, equivalents thereof, as well as additional items.

Reference will now be made to the accompanying drawings, which form a part hereof, and which show, by way of illustration, specific exemplary embodiments. The principles described herein may, however, be embodied in many different forms. The components in the figures are not necessarily to scale, emphasis instead being placed upon illustrating the principles of the invention. Moreover, in the figures, like-referenced-numerals may be placed to designate corresponding parts throughout the different views.

In the following description of the invention, certain terminology is used for the purpose of reference only and is not intended to be limiting. For example, although the terms first, second, etc. may be used herein to describe various elements, these elements should not be limited by these terms. These terms are only used to distinguish one element from another. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed terms. It will be further understood that the terms "comprises" and/or "comprising," when used in this specification, specify the presence of stated features, integers, steps, operations, elements, and/or components, but do not preclude the presence or addition of one or more other features, integers, steps operations, elements, components, and/or groups thereof.

FIG. 1 illustrates configurations 100, 130, 160 or states for a split load connection, according to some embodiments of the present disclosure. In designing an electrical system, attention is typically given to the overall load power requirements, the timing of when sub-loads or load blocks of the overall original load are energized, and future growth potential of additional loads load blocks. Once this process has been completed, a design decision can be made to power a subset of these load blocks of the original load by a microgrid or other electricity source, with the remainder of the load blocks being powered by the utility grid. This power partitioning of the original load can result in three operating modes:

1. Shared Source Mode: As shown in a first configuration 100 of FIG. 1, a first load block Load One 101 is powered by Source One 107 (a utility grid) with a second load block Load Two 104 being powered by Source Two 104 (a microgrid or other electricity source). A power distribution hub (PDH) 113 (which may comprise one or more switches) connects the appropriate sources to the selected load blocks as shown.
2. Grid Source Mode: In a second configuration 130, both load blocks 132, 135 are powered by the Source One 139 (a utility grid). A power distribution hub (PDH) 114 (which may comprise one or more switches) connects power from the utility grid 139 to the load blocks 132, 135. In second configuration, a Source Two 140 (a microgrid or other electricity source) is not connected to any load blocks.
3. Microgrid Mode: As shown in a third configuration 160, a Source 2 172 (a microgrid or other electricity source) powers load a second load block Load Two 176 without connection of Source One 171 (a utility grid). A first load block Load One 163 is not powered by either source. A power distribution hub (PDH) 175 (which may comprise one or more switches) isolates Load One 163 and Source One 171 as shown.

When operated in this manner, a microgrid never interacts with the utility grid and consequently eliminates all microgrid-grid interconnection requirements. This dramatically simplifies the process of using microgrids. In essence, a utility grid becomes a system backup to the load blocks that are powered by the microgrid. Furthermore, partitioning loads in this manner enables cost-effective load management as some loads are more cost-effectively powered by the utility grid (e.g. heavy motor loads common to HVAC systems and elevators). A microgrid is readily designed to handle such loads but with an associated cost that is often significantly greater than the cost associated with power other types of loads.

Figure 2:
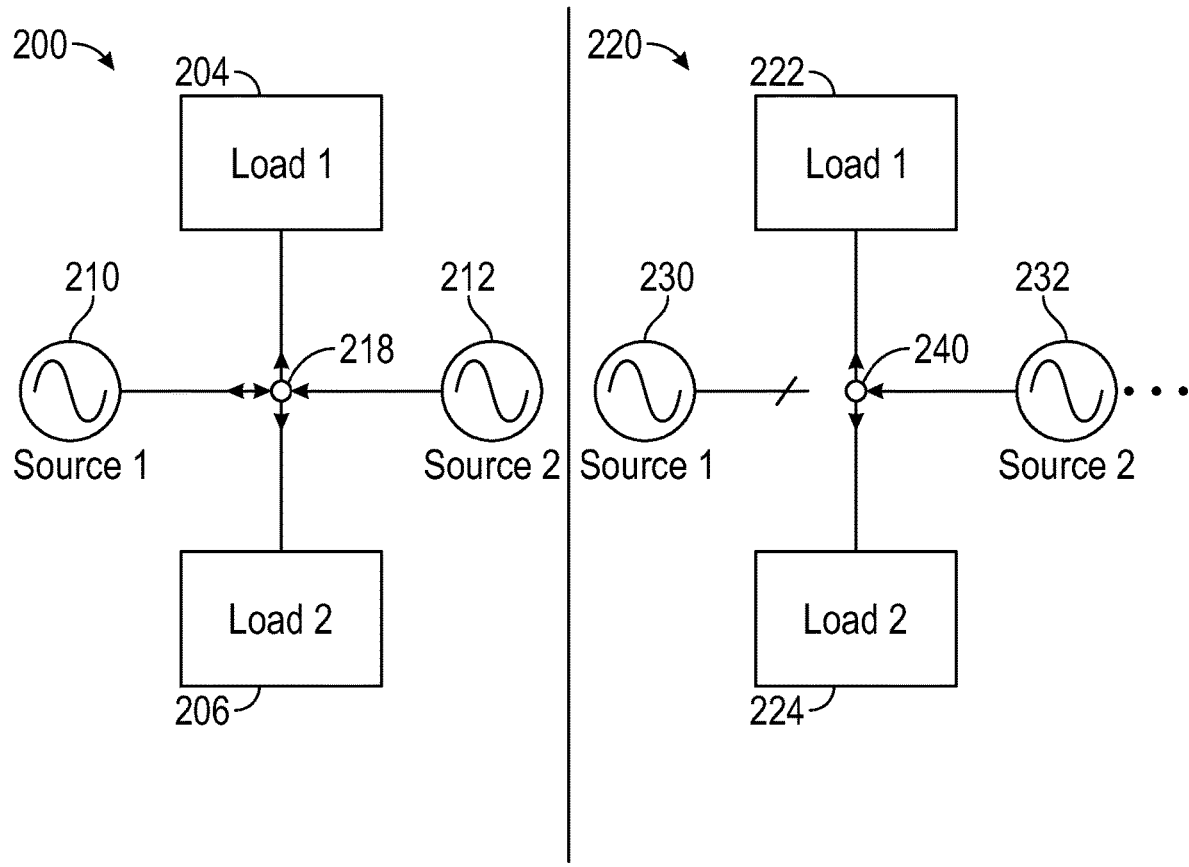
FIG. 2 illustrates two other configurations of split load connections, according to other embodiments of the present disclosure.

As illustrated in FIG. 1, the utility grid provides power to the first load block Load One 101 via the switch 113 configuration under all normal operating conditions. Note that if the utility grid goes dark, then the loads of the first load block Load One 101 will not be powered given the connection configuration illustrated in 160. Additional switching may be added to rectify this situation if desired so that if the utility grid goes dark, then all loads of the original load could be powered by the microgrid (e.g., as shown in FIG. 2 and described below with reference to the same). The microgrid 108 provides power to the island-loads of the second load block Load Two 104 under normal operating conditions.

Switches 113, 144, 175 have at least two operating configurations. When the switch 113 is in operating configuration 100, then the utility grid Source One 107 in FIG. 1 provides power to the grid load block Load One 101 and the microgrid 108 provides power to the island load block Load Two 104. When switches 144 are in operating configuration 130, then the utility grid Source One 139 provides power to both the grid load block Load One 132 and to the island load block Load Two 135. With this arrangement the microgrid is never connected to the grid (utility). Switches 113, 144, 175 may be manual or automated. As shown in the third configuration 160, the switch 175 may also be designed to operate in a third state where island load block Load Two 176 is powered by the microgrid Source Two 172 giving 100% island-mode operation with the utility grid Source One 171 being completely disconnected from the load blocks.

FIG. 2 illustrates two other configurations 200, 220 of n number of arbitrary systems. As shown in configuration 200, a first load block Load One 204 and a second load block Load Two 206 are being powered by a microgrid Source Two 212. The utility grid Source One 210 is being switched in this example by switches 218 over to the microgrid 212 source. Additional switches 218 are included so that if the utility grid Source One 210 goes dark, then all load blocks 204, 206 of the original load could be powered by the microgrid Source Two 212. Still, the utility grid Source One 210 remains unaffected by the microgrid Source Two 212.

As shown in the second configuration 220, the utility grid Source One 230 is completely isolated by switches 240 from the rest of the system. The microgrid Source Two 232 is connected via switches 240 to power the load blocks 222 and 224. Stated otherwise, the switches 240 enable the microgrid Source Two 232 to power all (100%) of the original load when the utility grid Source One 230 is unavailable (e.g., including when the utility grid goes dark). Still, the utility grid Source One 230 remains unaffected by the microgrid Source Two 232.

Figure 3:
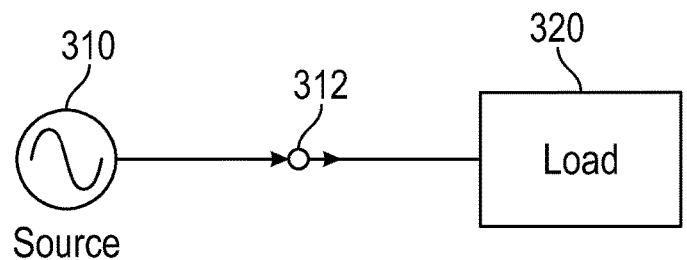
FIG. 3 illustrates a typical grid and load configuration.

FIG. 3 illustrates a typical grid and load configuration. In this example, a load 320 is powered via switch 312 by a source 310 (e.g., a utility grid). The switch 312 may have circuit protection in the form of a circuit breaker or a fuse. No alternate source is supplied to the load 320 in this example.

Figure 4:
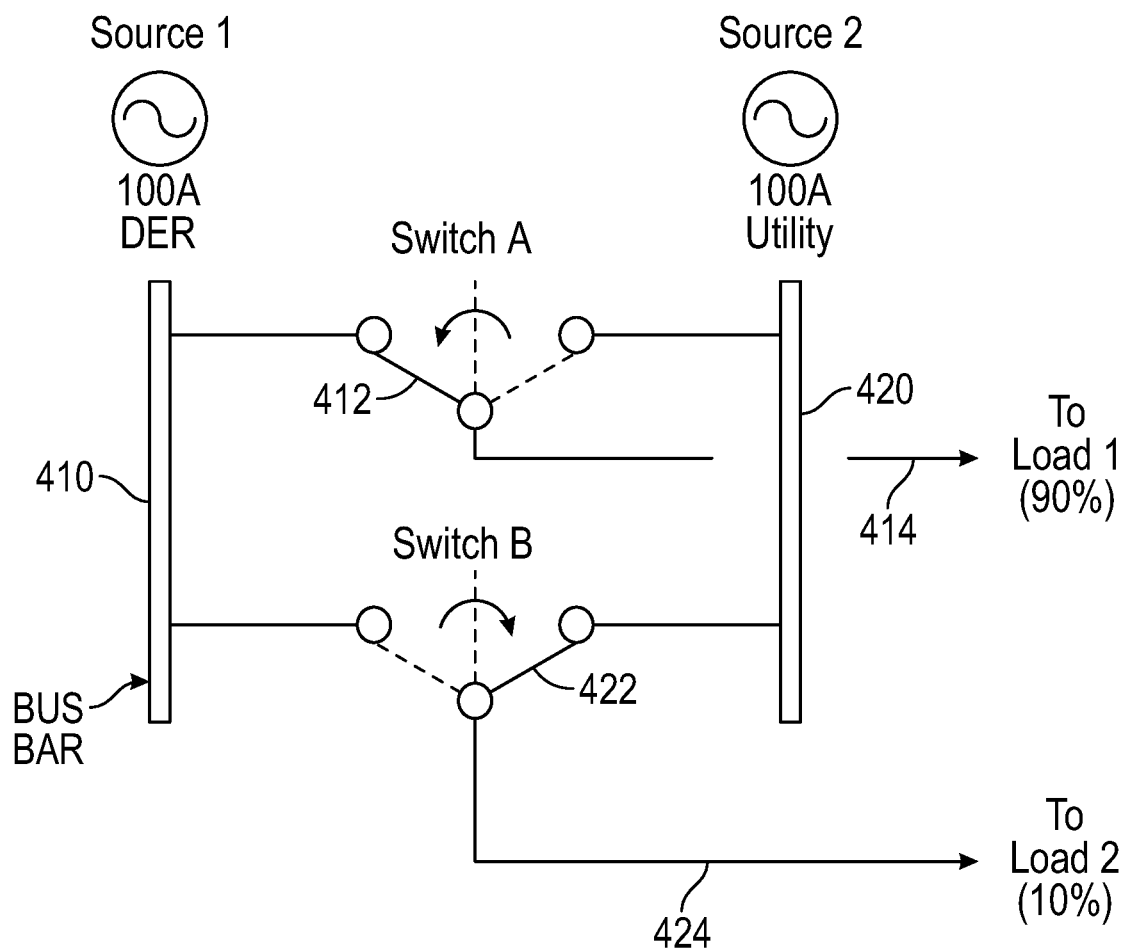
FIG. 4 is a detailed circuit diagram of a Two Switch configuration, according to some embodiments of the present disclosure.

FIG. 4 is a circuit diagram of a Two Switch configuration, according to some embodiments of the present disclosure. Source 1 busbar 410 is shown as a Distributed Energy Resource (DER) with the busbar 410 rated at 100 amps. In this example embodiment, a switch A 412 has been switched to power 414 a first load block Load 1 as shown. The switch A 412 is a break before make switch and is rated to be able to appropriately handle the current. The first load block Load 1 is 90% of the total original load. Source 2 busbar 420 is shown as a Utility Grid with the busbar 420 also rated at 100 amps. In this example, a switch B 422 has been switched to power 424 Load 2 as shown. The switch B 412 is also a break before make switch and is similarly rated to be able to appropriately handle the current. The second load block Load 2 is 10% of the total load. Both switches 412 and 422 are "break before make" switches so that loads and sources may be completely isolated while being switched over. As can be appreciated, the ratio of load between load blocks (Load 1 and Load 2) can be any ratio—fore example 0% on the first load block Load 1 with 100% on the second load block Load 2, to 100% on the first load block with 0% on the second load block and every ration in between. Moreover ratios between three or more load blocks are also possible, as the example illustrated in FIG. 5 and described with reference to the same.

Figure 5:
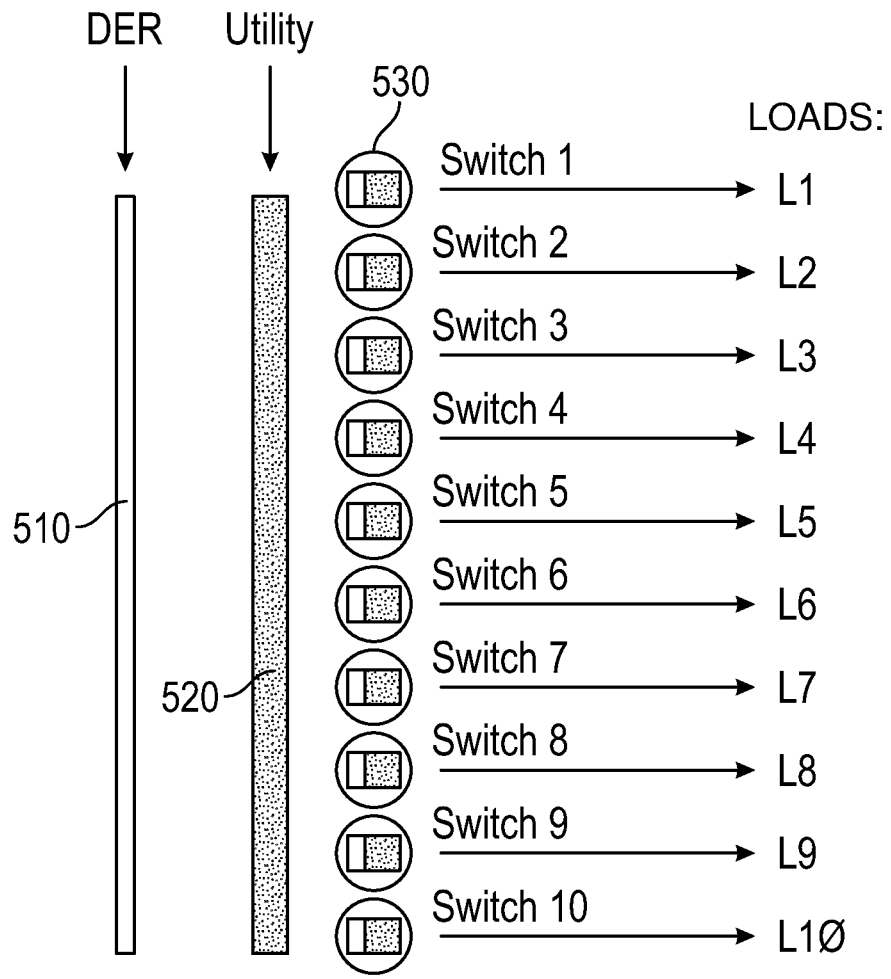
FIG. 5 is a circuit diagram of a Ten Switch configuration, according to some embodiments of the present disclosure.
Figure 5:
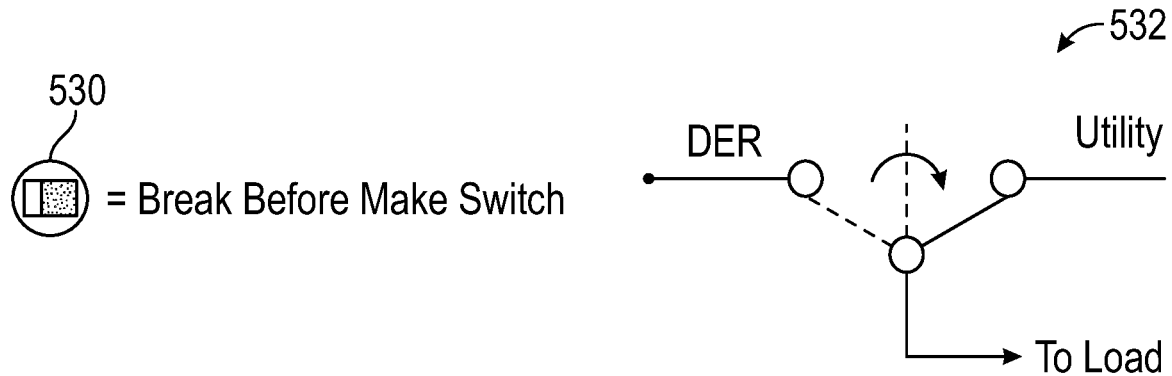

FIG. 5 is a circuit diagram of a Ten Switch configuration. This diagram illustrates how multiple (in this example ten) break-before-make switches 530 are incorporated into a frame, with a DER busbar 510 and a Utility grid busbar 520 providing power to the switches 530. Each switch 530 may be switched to connect each of the loads L1 to L10 to either the DER busbar 510 or the Utility grid busbar 520 as needed. Multiple switching configurations are possible with this configuration. For example, loads L1-L4 may be connected to the DER, and loads L5-L10 may be connected to the Utility grid. A detailed view of a switch 532 shows the break-before-make configuration typical for the switches 530, as shown in the diagram.

Although FIG. 4 illustrates the Two-Switch configuration and FIG. 5 illustrates the Ten-Switch configuration, it can be appreciated that an arbitrary n number of switches may be utilized to split an original load and/or connect load blocks according to embodiments of the present disclosure.

Figure 6:
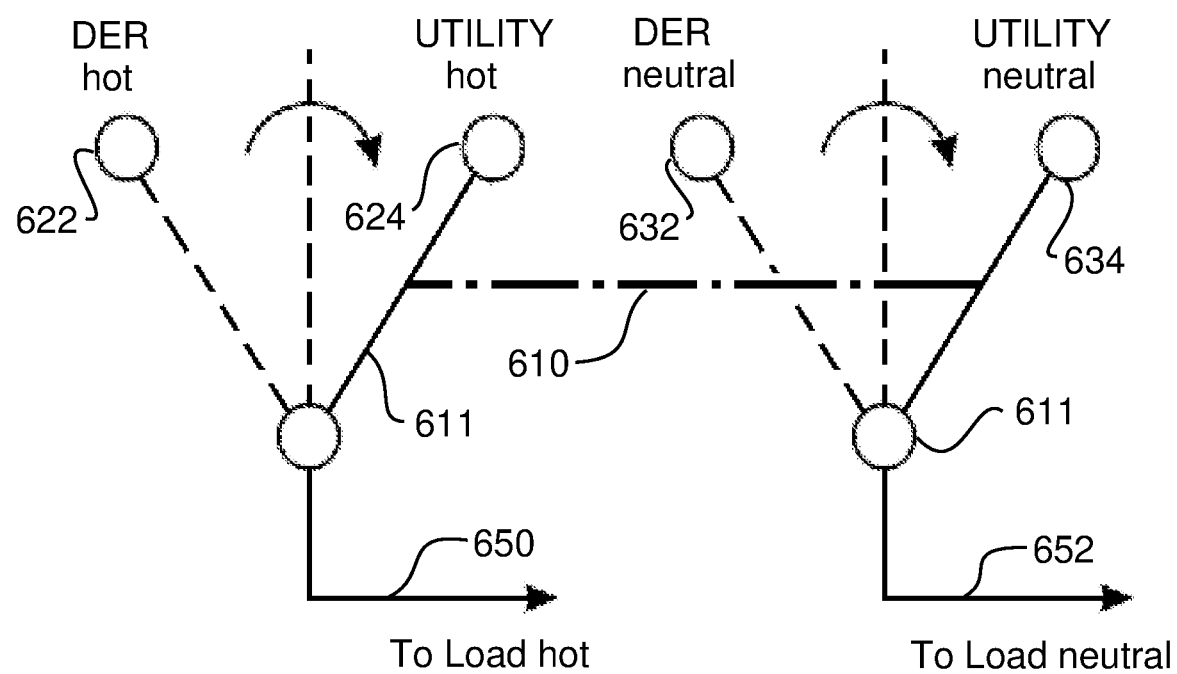
FIG. 6 is a circuit diagram of a Double-Pole Double-Throw Break Before Make Switch configuration.

FIG. 6 is a Circuit Diagram of a Double-Pole Double Throw Break Before Make Switch configuration. The double pole switch 610 switches both legs 611 from the DER source of power over to the Utility. The connection to the DER Hot 622 is switched over to the Utility hot 624 at the same time as the DER neutral 632 is switched over to the Utility neutral 634 as shown. In this way, the power to the load is switched over to Utility (Grid) power. The Load is served by a hot 650 and neutral 652 from the double-pole double throw switch. As shown in this embodiment, both hot and neutral are being supplied to the Load by the Utility. The advantage of this switching configuration is the isolation of the Utility neutral from the DER. In some cases, unwanted transients and harmonics may be transmitted over the neutral to the DER system after it the served Load has been switched over to the DER. By providing a double pole double throw break before make switch configuration, the isolation of the neutral from the utility is achieved. This prevents any and all stray transients and harmonics from transmitting thru the neutral, since it is fully isolated by the switch as exemplified in this embodiment.

EXAMPLES

Some examples of embodiments of the present disclosure are provided here.

Example 1

A method of commissioning a microgrid, comprising: dividing an original load into at least two distinct load blocks; electrically connecting a first load block of the two distinct load blocks to receive electricity from a utility-scale electricity grid; electrically connecting a second load block of the two distinct load blocks to receive electricity from a microgrid; and connecting a switch between the first load block and the second load block, the switch to disconnect the second load block from the microgrid and to connect the second load block to the utility-scale electricity grid (e.g., and thereby restore the entire original load to being powered by the utility-scale electricity grid, if the microgrid is unable to power the second load block), wherein the switch maintains the microgrid isolated from the utility-scale electricity grid.

Example 2

The method of Example 1, wherein the switch is a manual switch.

Example 3

The method of Example 1, wherein the switch is a break-before-make switch.

Example 4

The method of Example 1, wherein the switch is a double-pole double-throw switch that switches both neutrals and hot circuits of the utility-scale electricity grid and the microgrid.

Example 5

The method of Example 1, wherein the original load is divided into at least three distinct load blocks, the method further comprising: electrically connecting a third load block of the three distinct load blocks to receive electricity from the microgrid; and connecting a second switch to disconnect the third load block from the microgrid and to connect the third load block to the utility-scale electricity grid, wherein the switch maintains the microgrid isolated from the utility-scale electricity grid.

Example 6

The method of Example 1, wherein the second block comprises between 0% and 100% of the original load, between 1% and 99% of the original load, between 10% and 90% of the original load, between 30% and 70% of the original load, between 50% of the original load, or any other ratio.

Example 7

The method of Example 1, wherein the switch restores the entire original load to being powered by the utility-scale electricity grid, if the microgrid is unable to power the second load block.

Example 8

A split-load power distribution system comprising: two or more power sources comprising: a utility grid (Grid) connected power source; and at least one Distributed Energy Resource (DER) power source; wherein the system further comprises: at least one electrical load; and at least one power distribution hub (PDH) comprising at least one switch, wherein the PDH distributes power from a first power source of the two or more power sources to a first partial load of the electrical load, wherein the PDH distributes power from a second power source of the two or more power sources to a second partial load of the electrical load, and wherein the PDH controls the power flow from the DER, preventing backflow to the Grid.

Example 9

The split-load power distribution system of Example 8, wherein the switch is a manual switch.

Example 10

The split-load power distribution system of Example 8, wherein the switch is a double-pole double-throw switch that switches both neutrals and hot circuits of the Grid and DER.

Example 11

The split-load power distribution system of Example 8, wherein the switch further comprises a circuit protection device.

Example 12

The split-load power distribution system of Example 8, further comprising a frame with multiple electrical receptacles configured to receive multiple PPD's; and wherein multiple switches of the at least one switch are detachably plugged-in to the multiple electrical receptacles.

Example 13

The split-load power distribution system of Example 8, wherein the at least one switch is controlled by the PDH.

Example 14

The split-load power distribution system of Example 8, wherein the PDH further comprises a control system and a processor.

Example 15

The split-load power distribution system of Example 14, wherein the control system manages and distributes power from multiple power sources to multiple electrical loads.

Example 16

The split-load power distribution system of Example 15, wherein the DER further comprises an energy storage device.

Example 17

The split-load power distribution system of Example 16, wherein the control system manages and distributes power from multiple power sources by switching one or more of the at least one switches.

Example 18

The split-load power distribution system of Example 17, wherein the control system monitors the storage capacity of the energy storage device.

Example 19

The split-load power distribution system of Example 18, wherein the control system sends a low energy alert signal to the processor when a first DER's energy storage device's capacity is below a pre-determined level.

Example 20

The split-load power distribution system of Example 8, wherein multiple switches of the at least one switch are electrically connected in parallel.

It will be obvious to those having skill in the art that many changes may be made to the details of the above-described embodiments without departing from the underlying principles of the invention. The scope of the present invention should, therefore, be determined only by the following claims.

The invention claimed is:
1. A split-load power distribution system comprising:
a distributed energy resource (DER) power source comprising an energy storage device;
an electrical load comprising a first partial load and a second partial load; and
at least one power distribution hub (PDH) comprising at least a first switch configured to operate independent of a second switch of the PDH, wherein the PDH is configured to:
distribute power, via the first switch from a first one of the DER power source via a first busbar or a grid-connected power source via a second busbar, to the first partial load of the electrical load, and isolate the first partial load from the grid-connected power source when the first partial load is receiving power from the DER power source;

distribute power, from a remaining one of the DER power source via the first busbar or the grid-connected power source via the second busbar, to the second partial load of the electrical load, and isolate the second partial load from the grid-connected power source when the second partial load is receiving power from the DER power source; and in response to a signal that a capacity of the energy storage device of the DER power source is below a pre-determined level, control at least one of the first switch or the second switch to distribute, to the first partial load and the second partial load, via the second busbar, power from the grid-connected power source.

2. The split-load power distribution system of claim 1, wherein the DER power source is isolated from the first partial load and the second partial load when the first partial load and the second partial load are receiving power from the grid-connected power source, and the grid-connected power source is isolated from the first partial load and the second partial load when the second partial load is receiving power from the DER power source.

3. The split-load power distribution system of claim 1, wherein switch is a double-pole double-throw switch configured to switch both neutrals and hot circuits of the DER and second power source.

4. The split-load power distribution system of claim 1, wherein the at least two switches further comprise a circuit protection device.

5. The split-load power distribution system of claim 1, wherein the first switch and the second switch comprise a first terminal coupled to the first busbar and a second terminal coupled to the second busbar, and wherein the PDH is further configured to control the first switch to selectively couple either the DER power source or the second power source to the first partial load of the electrical load, and to control the second switch to selectively couple either the DER power source or the second power source to the second partial load of the electrical load.

6. The split-load power distribution system of claim 1, wherein the PDH further comprises a control system and a processor and wherein the signal is sent from the control system to the processor.

7. The split-load power distribution system of claim 6, wherein the control system is configured to manage and to distribute power from a plurality of power sources to a plurality of electrical loads, wherein the plurality of power sources comprises at least the DER power source and the grid-connected power source and the plurality of electrical loads comprise at least the first partial load and the second partial load.

8. The split-load power distribution system of claim 7, wherein the control system is configured to monitor the capacity of the energy storage device of the DER power source.

9. The split-load power distribution system of claim 7, wherein the PDH comprises a plurality of switches comprising the first switch and the second switch coupled to the plurality of respective electrical loads, and wherein the control system is configured to manage and distribute power from the plurality of power sources by switching one or more switches of the plurality of switches.

10. The split-load power distribution system of claim 6, comprising multiple electrical receptacles and wherein the first switch and the second switch are detachably plugged-in to the multiple electrical receptacles.

11. The split-load power distribution system of claim 6, comprising a third partial load of the electrical load, wherein the PDH is configured to distribute power from the DER power source to the third partial load and isolate the third partial load from the grid-connected power source when the third partial load is receiving power from the DER power source.

12. The split-load power distribution system of claim 9, wherein the plurality of switches are electrically connected in parallel.

* * * * *